Aug. 26, 1952  C. S. PACKER ET AL  2,608,639
PORTABLE LANTERN HAVING CONTACT ACCOMMODATING A SINGLE
LANTERN BATTERY OR A PLURALITY OF FLASHLIGHT CELLS
Filed March 21, 1950  3 Sheets-Sheet 1
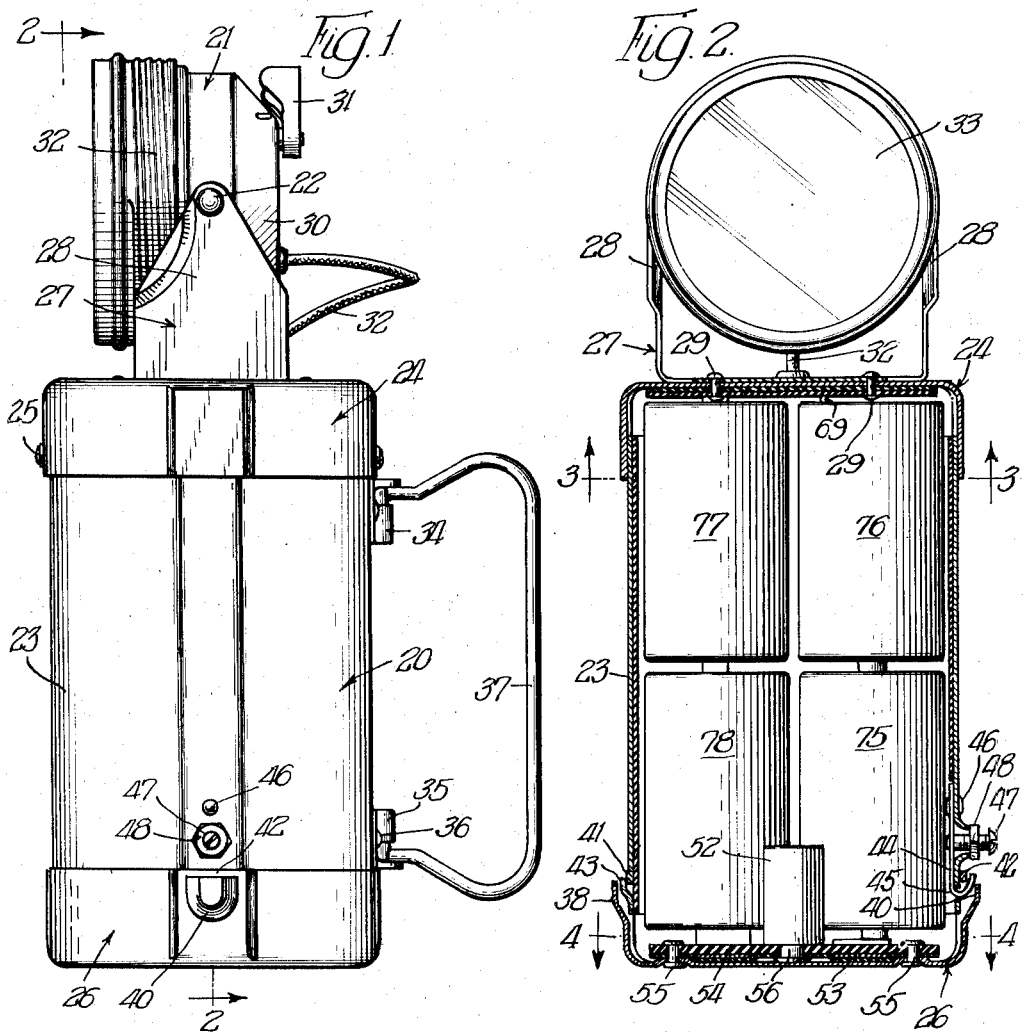
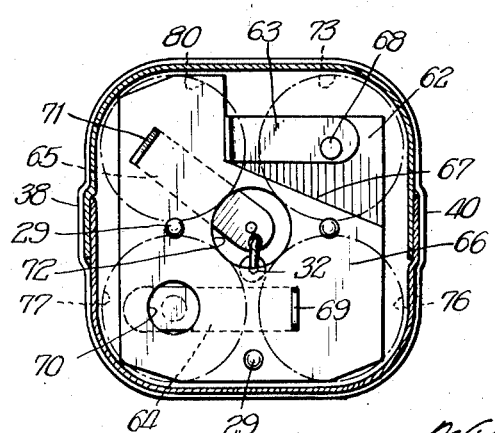
INVENTORS
Charles S Packer,
BY Marvin R. Olsen,

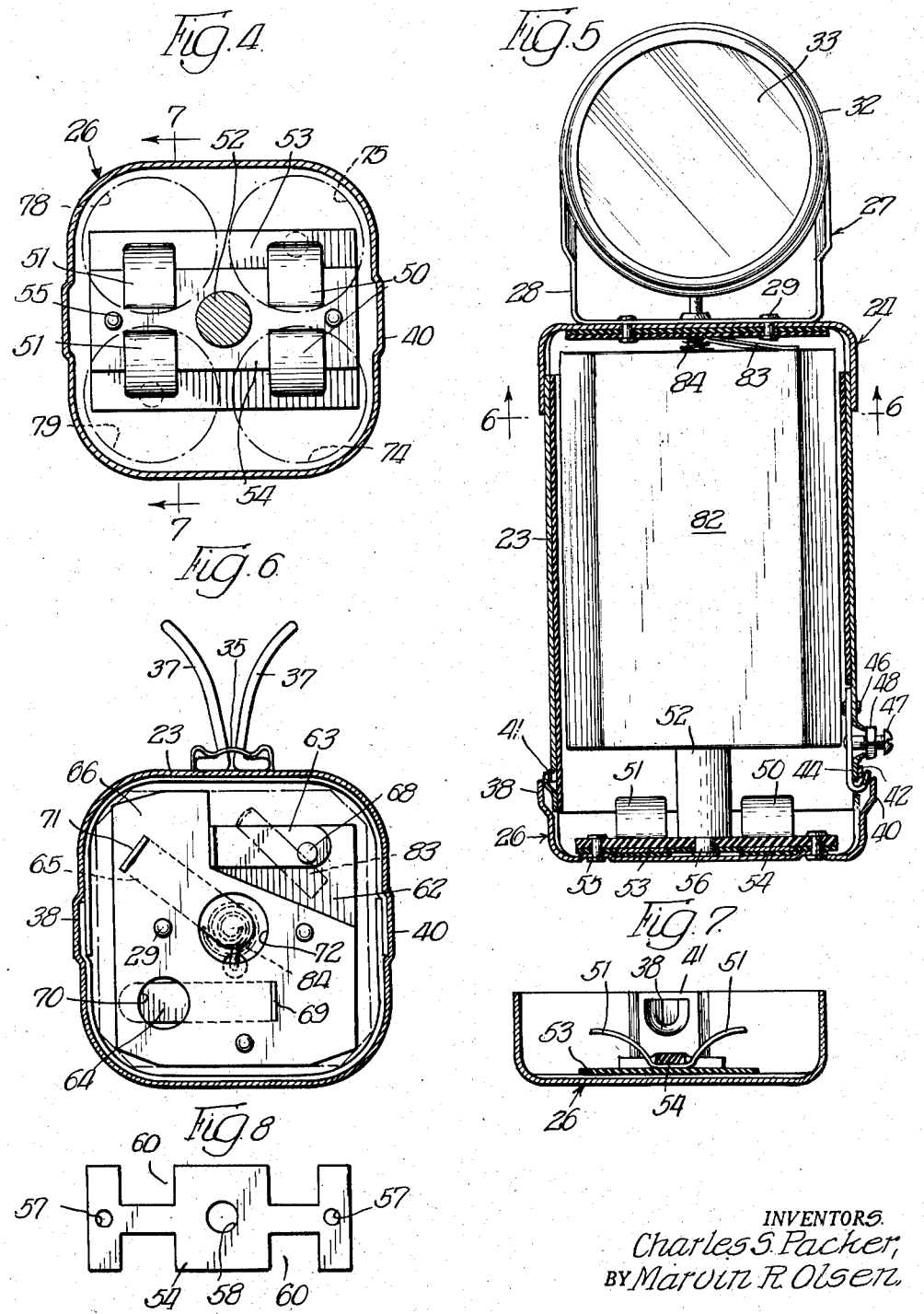

Aug. 26, 1952 — C. S. PACKER ET AL — 2,608,639
PORTABLE LANTERN HAVING CONTACT ACCOMMODATING A SINGLE
LANTERN BATTERY OR A PLURALITY OF FLASHLIGHT CELLS
Filed March 21, 1950
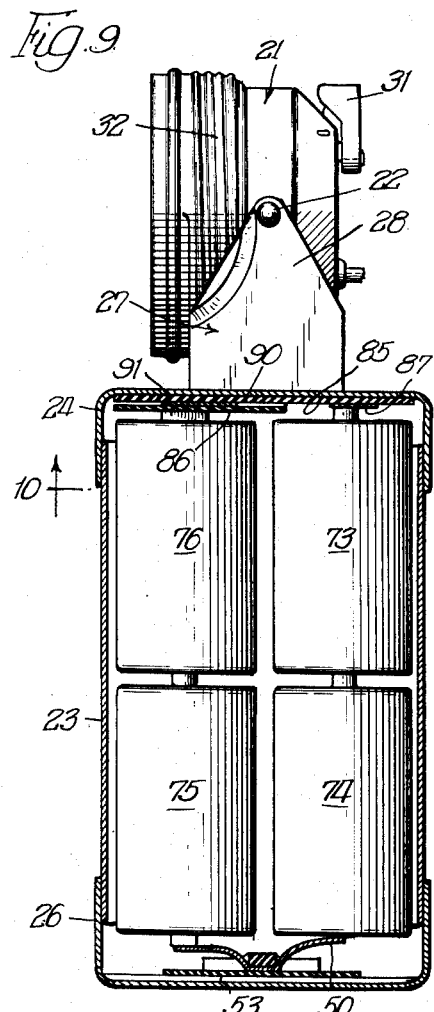
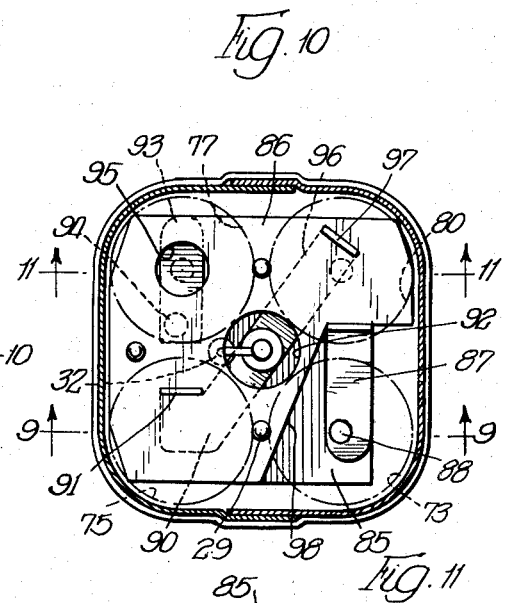
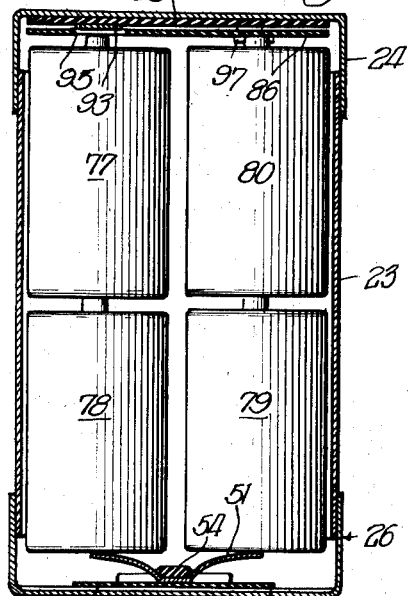
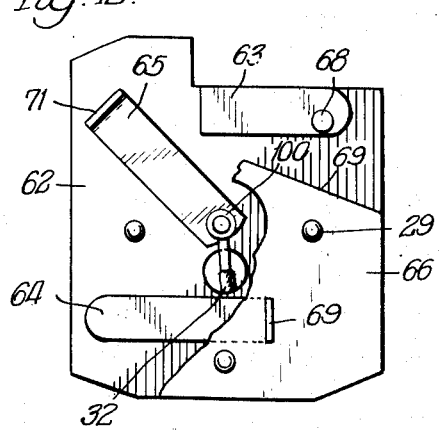
INVENTORS
Charles S. Packer,
BY Marvin R. Olsen, Patented Aug. 26, 1952

2,608,639

UNITED STATES PATENT OFFICE 2,608,639

PORTABLE LANTERN HAVING CONTACT ACCOMMODATING A SINGLE LANTERN BATTERY OR A PLURALITY OF FLASHLIGHT CELLS

Charles S. Packer, Chicago, and Marvin R. Olsen, Glen Ellyn, Ill., assignors to Justrite Manufacturing Company, Chicago, Ill., a corporation of Illinois Application March 21, 1950, Serial No. 150,837

4 Claims. (Cl. 240—10.63)

The invention relates to lanterns and has reference in particular to a portable electric lantern capable of producing a high intensity light beam and which embodies improvements rendering the lantern adaptable for using a plurality of flashlight cells or a single lantern battery.

The casing of the present lantern has a fixed top member supporting a light producing section, such as the headlight lantern of Reissue Patent No. 23,193, for pivotal movement on trunnions about a horizontal axis. The casing also has a bottom member which is releasable to permit the insertion within the casing of the flashlight battery cells or lantern battery. The length of the casing is such as to permit eight flashlight cells to be positioned within the same in two superimposed rows of four each and accordingly the casing has a length considerably in excess of that necessary for accommodating a lantern battery. To adapt the casing to both types of battery units the casing embodies certain improvements and in particular the top and bottom members of the casing are equipped with novel contact structure for accommodating both types of batteries and which provides circuit means electrically connecting with the headlight lantern irrespective of which type of battery is used.

An object of the invention is to provide an improved portable lantern capable of using eight flashlight cells or a single lantern battery for producing a high intensity light beam and for which purpose the casing is provided with electric circuit means having utility with both types of battery units and which requires that the operator insert the battery units in the casing in a proper manner.

Another object resides in the provision of electric contact elements secured to the top member but properly insulated therefrom and arranged so as to complete an electric circuit from the battery unit or units within the casing to the headlight lantern.

A further object in connection with the present portable lantern resides in the provision of electric contact elements as above described which will be foolproof since the desired electric circuit to the headlight lantern can be completed only when the battery unit or units are properly positioned within the casing of the present device.

Another object is to provide a portable lantern that will accommodate eight flashlight cells which when associated in proper electrical relation are electrically connected by contact means carried by the top and bottom members respectively.

A further object is to provide electric contact means for a portable lantern which will accommodate a single lantern battery or eight flashlight cells and wherein the said flashlight cells may be arranged to provide two parallel circuits of four each. It is possible to arrange the four cells of one circuit to electrically disconnect them from the headlight lantern, in which case the other circuit of four cells will operate to energize the light and the disconnected cells are thus carried as spare batteries to be used at some later time.

Another object of the invention is to provide a flashlight lantern consisting of a casing and a headlight section journalled thereby and which will have an upright vertical position when placed on a table, desk or similar supporting surface and in which position the headlight section thereof may be rotated on a horizontal axis so that the light beam can be cast in a plurality of directions.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts—

Figure 1 is a side elevational view of the portable lantern selected for illustrating the present invention;

Figure 2 is a vertical sectional view taken substantially along line 2—2 of Figure 1 and showing flashlight cells within the casing;

Figure 3 is a transverse sectional view substantially on line 3—3 of Figure 2 showing the contact elements carried by the top member and their special arrangement so that the flashlight cells will coact therewith;

Figure 4 is a transverse sectional view taken substantially along line 4—4 of Figure 2 and showing the contact elements and supporting stud carried by the releasable bottom member of the casing;

Figure 5 is a vertical sectional view similar to Figure 2 but showing the manner in which a lantern battery may be accommodated by the casing of the present lantern;

Figure 6 is a transverse sectional view substantially along line 6—6 of Figure 5 showing the coaction of the terminals of the lantern battery with the contact elements carried by the top member of the casing;

Figure 7 is a view substantially along line 7—7 of Figure 4;

Figure 8 is a top plan view of an insulating element carried by the bottom member;

Figure 9 is a vertical sectional view similar to Figure 2 but showing a modified form of the invention wherein the eight flashlight cells carried by the casing may be electrically connected to form one or two parallel circuits of four each;

Figure 10 is a transverse sectional view taken substantially along line 10—10 of Figure 9 showing the arrangement of the contact elements for this modified form;

Figure 11 is a vertical sectional view substantially along line 11—11 of Figure 10; and Figure 12 is a plan view of an arrangement of electric contact elements such as shown in Figure 3 illustrating a minor modification with parts being broken away to better illustrate the contact elements.

Referring to the drawings, the flashlight lantern selected for illustrating the present invention essentially consists of a casing 20 and a light producing section 21 pivotally supported by the casing for movement about a horizontal axis on the trunnions 22. The casing 20 includes a body portion 23 substantially square in cross section, a top member 24 fixedly secured to the body portion as by one or more rivets such as 25, and a bottom member 26 which is releasable with respect to the body portion to permit insertion within the casing of one or more battery units. The top member 24 supports a yoke 27 providing spaced supporting arms 28, said yoke being suitably secured to the top wall of the casing by rivets 29. The light producing section 21 is journalled by trunnions 22 in the yoke 27 whereby the section can be rotatably adjusted about a horizontal axis for casting the light beams in the directions as desired by the operator. Said light producing section includes the reflector housing 30 adapted to contain a socket for receiving a light bulb and a reflector in proper association with the light bulb. Said elements are not disclosed since they form no part of the present invention. A lens ring 32 is threaded to the housing 30 and said lens ring retains the lens 33.

For a complete explanation of the headlight section reference is made to the Reissue Patent No. 23,193 granted January 31, 1950 to Packer and Olsen and entitled Headlight Lantern, which describes and claims improved switch structure for controlling the electric circuit from the battery units within the casing to the light bulb retained within headlight section 21. The lever 31 located exteriorly in associated relation with the rear wall of the headlight section constitutes part of said improved switch structure and which is adapted to be oscillated for controlling the electric circuit to the light bulb, it being understood that one terminal of said electrical circuit is grounded to the metal of the casing, whereas, the other terminal includes the insulated conductor 32.

The handle for carrying the present lantern is provided by the body portion 23 of the casing, the same having top and bottom hinge members 34 and 35, respectively, secured thereto as by one or more rivets 36. The bails 37 are journalled at their respective ends by the hinge members, the construction providing detent means for holding the bails in a collapsed position in contact with the side walls of the body portion or in an extended carrying position as shown in Figures 1 and 6, in which position the bails project outwardly from the side wall of the body portion to provide handles for convenient grasping by the user.

The bottom member 26 of the casing has been described as releasable for permitting battery units to be inserted within the same. The releasable structure of the bottom member includes interengaging members on the body portion and bottom member respectively, at least one of said interengaging members being manually operable for effecting connection and disconnection of the bottom member with the body portion of the casing. As best shown in Figures 2 and 5, the opposed side walls of the bottom member are dished outwardly as at 38 and 40, the construction providing a retaining strip 41 and 42, respectively. One side wall of the body portion 23 of the casing is provided with an ear 43 adapted to have interengaging relation with the retaining strip 41. The opposite side wall of the body portion is provided with a latch 44 of spring metal suitably secured to the inside wall of the casing by the rivet 46 and having its hook end 45 projecting outwardly of the body member through an opening in the same. The hook end of the latch is associated with the outwardly dished portion 40 of the bottom member and for retaining the bottom member in place said hook end has interengaging relation with the retaining strip 42. The latch 44 may be actuated by the operator through the threaded stud 47 and for holding the latch in a locked position the nut 48 is provided.

The bottom member of the casing carries a pair of resilient contact members 50 and 51, the same being disposed on the respective sides of a supporting stud 52. The contact members 50 and 51 are suitably insulated from the metal of the bottom member by plate 53 of insulating material. A retaining plate 54, also of insulating material, is associated with plate 53 and the two plates are secured together and to the wall of the bottom member by rivets 55, as best shown in Figure 2. It will be understood that contact members 50 and 51 are retained in place since the central portion of each member is confined between the insulating plates. The said insulating plates are additionally secured to each other approximately centrally of their area by supporting stud 52 which is properly positioned centrally of the bottom member by being riveted as at 56 to said insulating plates. In accordance with the invention the supporting stud has utility for supporting the lantern battery within the casing and which is supported thereby at the proper distance above the bottom member and above the resilient contact members 50 and 51. The said contact members have utility for supporting the flashlight batteries and they have the additional function of electrically connecting the batteries supported thereby to effect a series circuit connection of said batteries for energizing the light bulb in the headlight section. The retaining plate 54, as shown in Figure 8, is formed with end openings 57 for receiving the securing rivets 55 and the same is also provided with the central opening 58 for receiving rivet 56 of the supporting stud 52. The plate 54 is also slotted as at 60, a pair of slots being located in spaced relation along each side edge and which are provided so as to permit free movement of contact members 50 and 51. Each of the contact members may comprise a single copper strip, as best shown in Figure 7, and which is retained in position by the insulator 54. The insulator 54 has a thickness so as to function as a stop member. Should a sudden jar of the flashlight lantern together with the normal weight of the flashlight batteries substantially flatten the contact members the batteries will contact insulating plate 54 to prevent further flattening of the members beyond their elastic limit. In this connection, it will be observed that plate 53 has a width sufficient to maintain the contact members suitably insulated from the bottom member in any and all positions of the contact members.

The contact elements carried by the top member 24 are suitably insulated from the metal of said member by means of the plate 62 of insulating material, the said plate covering substantially the entire area of the top wall of said member 24. The contact elements indicated by 63, 64 and 65 are disposed between the insulating plate 62 and a second plate 66, also of insulating material, the two said plates being secured together and to the top wall of member 24 by the rivets 29. The plate 66 has one corner thereof cut away on line 67 to expose the entire area of the contact element 63, and it will also be observed that element 63 is secured to plate 62 by the rivet 68 which additionally functions to ground the contact member 63 to the metal of the casing, the said ground connection constituting one terminal of the light circuit as is well understood in the art. The contact element 64 is provided with an upwardly projecting heel portion 69 which extends for a short distance above the surface of the overlying insulating plate 66. It will be noted that the heel portion 69 is offset laterally with respect to the center of the flashlight battery disposed in this corner of the casing. This offsetting of the heel portion 69 is in accordance with the invention since the heel portion is designed for contact with the negative electrode, that is, with the bottom of the adjacent flashlight battery and it is purposely intended that the center terminal or positive electrode of the flashlight battery should not contact or engage the heel portion. However, the positive electrode of the adjacent flashlight battery disposed in the opposite side corner of the casing has contact with element 64 since the insulating plate 66 is provided with the circular opening 70 for the purpose and which is in vertical alignment, being concentrically disposed with respect to the positive terminal of the battery. Contact element 65 has a heel portion 71 similar in all respects to heel portion 69 and which is located diagonally opposite heel portion 69. Said heel portion 71 is offset outwardly with respect to the center of the flashlight battery located in this corner of the casing so that the heel portion will not contact the positive electrode of the adjacent flashlight battery but will be engaged only by the bottom or negative electrode of the battery. The circuit to the light bulb in the headlight section is completed by the conductor 32 which extends through the top wall of member 24 and through openings 72 in the insulating plate 66 to have electrical contact with the end of element 65 opposite its heel portion 71. The opening 72 in the overlying insulating plate 66 exposes this end of contact element 65 and it will be understood as the description proceeds that said end of contact element 65 is engaged by the center or positive terminal of a lantern battery upon location of the same within the casing.

As previously explained, the contact members 63, 64 and 65 have an arrangement such that the present lantern can make use of a plurality of flashlight cells or a single lantern battery as the electric energy for the light. It is possible to purchase both types of battery units on the market and the adaptability of the contact elements to both types produces a versatile lantern of general utility.

Figures 2, 3 and 4 show the present lantern equipped with eight flashlight batteries and which are electrically connected in series circuit relation to produce a beam of light of high voltage and intensity. The flashlight batteries are positioned within the casing in two superimposed layers of four each, with each battery, as regards each layer, being located in a corner of the casing, the wall of the casing at the corners being conveniently rounded so as to approximately conform to the curvature of the flashlight batteries. The contact element 63 has contact with the positive electrode of a flashlight battery 73 and said positive electrode approximately coincides with the rivet 68. The two batteries 73 and 74 located in this corner of the casing are supported by one projection of the contact member 50 with the negative electrode of battery 74 contacting said member. The next vertical row of batteries 75 and 76 are supported by the other projection of contact member 50. However with this row the positive electrode of battery 75 is in contact with the member. This accordingly locates the negative electrode of battery 76 in contact with the heel 69 of element 64. The circuit is therefore complete from the grounded rivet 68 through the two vertical rows of batteries including the contact member 50 carried by the bottom member of the casing.

Contact element 64 is adapted to be engaged by the positive electrode of battery 77 of the next vertical row of batteries, as is clearly evident from Figure 3, this vertical row and its adjacent row being supported by contact element 51 with one projection having engagement with the negative electrode of battery 78 and the other projection having contact with the positive electrode of battery 79. This brings the negative electrode of battery 80 in contact with the heel 71 of contact 65 and since this member is electrically connected to the light source in the headlight section the electric circuit to the same is complete. When the switch 31 is actuated to close the circuit, a high intensity light beam is produced as a result of the series circuit relation of the eight flashlight batteries retained within the casing of the present portable lantern. The arrangement of the contact members 63, 64 and 65 is such that the flashlight batteries must be properly inserted in the casing and associated in a manner so that the positive electrode of one battery is electrically connected to the negative electrode of its adjacent battery. When this is done the series circuit is complete. Should the batteries be located in the casing in an improper manner as regards the contact elements and members, the same will not make electrical connection therewith and so the circuit to the headlight section is not completed.

Figures 5 and 6 show the manner in which the casing of the present lantern receives a single lantern battery and which accordingly provides the electric energy for the light in the place of the plurality of flashlight batteries described in connection with Figures 2, 3 and 4. The lantern battery designated in its entirety by numeral 82 is substantially cylindrical in form and of such size as to fit within the casing. However, the length of the lantern battery is considerably less than twice the length of a flashlight battery so that the lantern battery terminates some distance above the bottom member. For this purpose the said bottom member is provided with the center stud 52 and which is of a height so as to position the lantern battery with its positive and negative electrodes in resilient contact with certain contact elements carried by the top member of the casing. When the flashlight batteries are used the stud 52 is nonoperative. However, by reason of the central position of the same the stud does not interfere with the flashlight batteries which are positioned around the same. When the lantern battery is used the contact members 50 and 51 are nonoperative. Likewise the said contact members do not interfere with the lantern battery in any manner.

It is necessary to so locate the lantern battery in the casing that the negative electrode 83 of the battery is in contact with the contact element 63. For this purpose the entire surface of the contact element 63 is exposed, it being observed that the negative electrode 83 has a diagonal direction extending completely across element 63. The positive terminal 84 of the lantern battery being disposed centrally of the battery has contact with element 65 at the end thereof exposed by the opening 72. The circuit to the headlight section is accordingly completed by the lantern battery since element 63 is grounded to the metal of the casing and element 65 has electrical connection with the positive conductor 32 of the light circuit.

It is of course possible to locate the lantern battery 82 in the casing so that the negative electrode 83 will not contact element 63. When this is done the electrical circuit is of course not completed. However, no harm is done either to the elements or to the battery and the operator should be instructed to first determine the proper rotative position of the lantern battery before inserting the same. Also it will be noted that when the lantern battery is used contact element 64 has no utility and neither do the heel portions 69 and 71. In this connection, it may be pointed out that when the flashlight batteries are employed all the contact elements fixed to the top plate of the casing are included in the electrical circuit. However, for the flashlight batteries it would not be necessary to provide the opening 72 for exposing the centrally located end of the contact element 65. Certain of the contact elements are accordingly employed with both types of battery units with all the contact elements being employed for the flashlight batteries.

Figures 9, 10 and 11 are directed to a modified form of the invention wherein the casing is likewise adapted to contain a plurality of flashlight batteries or a single lantern battery, and wherein contact elements are provided adaptable to both types of battery units and which contact elements complete the electric circuit to a light source irrespective of which type of battery unit is employed. Referring to Figure 9, it will be observed that the light producing section and the casing of the lantern is similar in all structural features to that disclosed in Figures 1, 2 and 4. The only structure that has been modified concerns the contact members. Said members are suitably insulated from the casing of the flashlight and from each other by the plates of insulating material 85 and 86, said plates being suitably secured in superimposed relation to the wall of the top member 24 by the rivets 29. One contact element 87 is riveted to plate 85 by the rivet 88 which additionally functions as a ground connection electrically connecting the element 87 to the casing of the lantern. The element 90, located in the opposite side corner of the casing, is provided with a heel portion 91 which projects through the overlying insulating plate 86 to depend below the plate. The remaining portion of element 90 is confined between the insulating plates with the exception of its terminal end which is exposed by the center opening 92 in plate 86. Said terminal end is yieldingly connected to the conductor 32. The next contact element is indicated by numeral 93, which element is suitably riveted in position between the insulating plates by rivet 94. Said rivet additionally functions as a ground connection electrically connecting element 93 to the casing. By means of the opening 95 in plate 86 a portion of element 93 is exposed and said opening 95 is located substantially concentric with the positive electrode of the flashlight battery adapted to be located in this corner of the casing. The next contact element, namely, 96, is located diagonally between the parallel elements 87 and 93 and the diagonal disposition of element 96 is such as to align with element 90. Said element 96 has a heel portion 97 which is offset with respect to the center of the flashlight battery adapted to be located in this corner of the casing. The end of element 96 opposite its heel portion 97 is exposed by the center opening 92 and said end is electrically connected to conductor 32.

The contact elements as shown in Figure 10 are constructed and arranged to electrically connect eight flashlight batteries so as to provide two parallel circuits of four each. Whereas in the structure of Figure 3 the contact elements are arranged to electrically connect the eight flashlight batteries in series to produce a light of extremely high intensity, the modification of Figure 10 reduces the voltage of the current with a corresponding increase in amperage which is approximately doubled. In the modified form of Figure 10 it will be seen that the elements 87 and 93 are both grounded. This contrasts with the elements 90 and 96 which are both connected to conductor 32 and each of these elements has an offset heel portion. When four flashlight cells are positioned in the casing in proper relation with respect to elements 87 and 90 the cells are electrically connected adjacent the bottom of the casing by the contact member 50, for example, and these four cells constitute a complete circuit to the light source which may be controlled by actuation of switch lever 31. The other four cells when properly associated with each other and with the elements 93 and 96 are supported and electrically connected by the contact member 51 at the base of the casing to likewise form a complete circuit for energizing the light source.

In accordance with the invention it is also possible to use the contact elements of Figure 10 with a single lantern battery. For this purpose the insulating plate 86 is cut away on line 98 to expose the contact element 87. Said element 87 is exposed in order for the same to contact the negative electrode 83 of the lantern battery. The positive electrode 84 of the lantern battery contacts the elements exposed by center opening 92 in much the same manner as described with respect to Figure 6.

Another feature as regards the contact elements of Figure 10 resides in the possibility of so arranging the flashlight batteries of one of the parallel circuits to disconnect the batteries of this parallel circuit, in which case the light source of the lantern is energized by only one circuit of four flashlight batteries. When the flashlight batteries are arranged as above described the four batteries which are disconnected are carried as spares.

Referring more particularly to Figure 9, the batteries 73, 74, 75 and 76 are shown in said figure as making proper electrical connection with the contact elements and with each other for completing the circuit to the light source. The positive electrode of battery 73 has contact with element 87. The two columns are supported by member 50 with the negative electrode of battery 74 and the positive electrode of battery 75 in contact therewith. This positions the negative electrode of battery 76 in contact with the heel portion 91 of element 90 to complete the circuit. In Figure 11 the four flashlight batteries 77, 78, 79 and 80 are improperly associated with each other and with the contact elements so as to maintain the batteries disconnected, whereby they are carried as spare parts and may be used at any future time. It will be seen that the batteries 77 and 80 both have their positive electrodes directed toward the contact elements. The positive electrode of battery 80 is ineffective to make electrical contact with the element 96 since this element has the heel portion 97 which is adapted to engage only the negative electrode of the flashlight batteries. Also batteries 78 and 79 are supported by member 51 with both negative electrodes in contact therewith.

Figure 12 discloses an arrangement of contact elements similar to Figure 3, the arrangement, however, embodying a slight improvement in that element 65 is electrically connected to conductor 32 by means of rivet 100. Otherwise the structure is the same as previously described with the several contact elements being insulated from the casing by plate 62 and being further insulated and retained in position as regards the elements 64 and 65 by the overlying insulating plate 66, the plates being secured by rivets 29.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a portable lantern, a casing adapted to contain a plurality of flashlight batteries or a single lantern battery, a light producing section carried by the casing exteriorly of the same, said casing having a fixed end wall and a releasable end wall, superimposed plates of insulating material secured to the fixed wall within the casing, contact elements carried by the said fixed wall interiorly of the casing and with which the batteries are adapted to contact for completing an electric circuit to the light producing section, said contact elements comprising metal strips disposed between the insulating plates and which insulate the strips from each other and from the casing, one of said contact elements having an electrical connection grounding the same to the casing, certain of said contact elements having a projecting heel portion at one end of the element and which extends through the overlying insulating plate, whereby the heel portions are exposed for contact, and said overlying insulating plate having an opening for each of said certain contact elements and which is located to expose for contact a second portion of the element at the end opposite the heel portion thereof, only certain of said contact elements being adapted to coact with the terminals of the single lantern battery, whereas all of said elements coact with the terminals of the flashlight batteries, other contact elements carried by the releasable end wall of the casing, said other contact elements coacting with the flashlight batteries when in the casing to electrically connect certain of said batteries, and a supporting stud also carried by the releasable end wall to provide a support for the lantern battery when in the casing to support the lantern battery in spaced relation from the said releasable end wall and from said other contact elements.

2. In a portable lantern, a casing substantially cylindrical in form and having a top wall and a bottom wall, said casing being adapted to contain a plurality of flashlight batteries or a single lantern battery, a light producing section carried by the casing exteriorly of the same, superimposed plates of insulating material fixed to the top wall within the casing, contact elements carried by said top wall in associated relation with said insulating plates and with which the batteries are adapted to contact for completing an electric circuit to the light producing section, said contact elements comprising metal strips disposed between the insulating plates and which insulate the strips from each other and from the casing, means grounding one contact element to the casing and the overlying insulating plate being cut away to expose a substantial part of said grounded contact element, certain of said contact elements having a projecting heel portion at one end of the element and which extends through the overlying insulating plate, whereby the heel portions are exposed for contact, and said overlying insulating plate having an opening for each of said certain contact elements and which is located to expose for contact a second portion of the element at the end opposite the heel portion thereof, other contact elements carried by the bottom wall, a central supporting stud also carried by said bottom wall, said other contact elements coacting with the flashlight batteries when in the casing to electrically connect certain of said batteries, and the supporting stud providing a support for the lantern battery when in the casing for supporting the same in spaced relation from the bottom wall and from said other contact elements.

3. In a portable lantern, a casing substantially cylindrical in form and having a fixed top member and a removable bottom member, said casing being adapted to contain a plurality of flashlight batteries or a single lantern battery, a light producing section carried by the casing exteriorly of the same, superimposed plates of insulating material fixed to the top wall within the casing, contact elements associated with said insulating plates and with which the batteries are adapted to contact for completing an electric circuit to the light producing section, said contact elements comprising metal strips disposed between the insulating plates and which insulate the strips from each other and from the casing, means grounding one contact element to the casing and the overlying insulating plate being cut away to expose a substantial part of said grounded contact element, two of said contact elements being disposed in spaced parallel relation, a third element being disposed between said spaced parallel elements and extending diagonally with respect thereto, certain of said elements having a projecting heel portion at one end of the element and which extends through the overlying insulating plate, whereby the heel portions are exposed for contact, said overlying insulating plate having an opening for said certain contact elements and which opening is located to expose for contact a second portion of the element at the end opposite the heel portion thereof, two of said contact elements being adapted to coact with the terminals of the single lantern battery, whereas all of said contact elements coact with the terminals of the flashlight batteries, other contact elements carried by the bottom wall and being insulated therefrom, a supporting stud also carried by the bottom wall, said other contact elements coacting with the flashlight batteries when in the casing to electrically connect certain of the batteries, and the stud providing a support for the lantern battery when in the casing for supporting the same in spaced relation from the bottom wall and from said other contact elements.

4. In a portable lantern, a casing having a fixed top member and a removable bottom member, said casing being adapted to contain a plurality of flashlight batteries or a single lantern battery, a light producing section associated with the casing, superimposed plates of insulating material fixed to the top wall within the casing, contact elements associated with said insulating plates and with which the batteries are adapted to contact for completing an electric circuit to the light producing section, said contact elements comprising metal strips disposed between the insulating plates and which insulate the strips from each other and from the casing, means grounding one contact element to the casing and the overlying insulating plate being cut away to expose said grounded contact element, certain of said elements having a projecting heel portion at one end of the element and which extends through the overlying plate, whereby the heel portions are exposed for contact, said overlying insulating plate having an opening for each of said certain contact elements and which opening is located to expose for contact a second portion of the element at the end opposite the heel portion thereof, two of said contact elements including the grounded element being disposed in spaced parallel relation and said grounded element being adapted to have contact with a terminal of a flashlight battery or a terminal of a lantern battery, and a third contact element being disposed between said spaced parallel elements and extending diagonally with respect thereto.

CHARLES S. PACKER.
MARVIN R. OLSEN.

REFERENCES CITED

The following references are of record in the file of this patent:

UNITED STATES PATENTS

| Number | Name | Date |
|---|---|---|
| 1,122,778 | Lyhne | Dec. 29, 1914 |
| 1,487,429 | Balderston | Mar. 18, 1924 |
| 1,825,354 | Jones | Sept. 29, 1931 |
| 2,053,591 | Wiley | Sept. 8, 1936 |
| 2,074,536 | Brown | Mar. 23, 1937 |
| 2,137,230 | Arden | Nov. 22, 1938 |